(12) United States Patent
Kamei et al.

(10) Patent No.: US 10,559,954 B2
(45) Date of Patent: Feb. 11, 2020

(54) METHODS AND APPARATUS FOR VOLTAGE AND CURRENT CALIBRATION

(71) Applicant: SEMICONDUCTOR COMPONENTS INDUSTRIES, LLC, Phoenix, AZ (US)

(72) Inventors: Atsushi Kamei, Maebashi (JP); Yasuaki Hayashi, Oura-gun (JP); Katsumi Yamamoto, Kokubunji (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 501 days.

(21) Appl. No.: 15/478,336

(22) Filed: Apr. 4, 2017

(65) Prior Publication Data

US 2018/0287374 A1    Oct. 4, 2018

(51) Int. Cl.
*H02H 7/18* (2006.01)
*H01M 10/42* (2006.01)
(Continued)

(52) U.S. Cl.
CPC ............ *H02H 7/18* (2013.01); *H01M 10/425* (2013.01); *H02H 3/006* (2013.01); *H01M 10/44* (2013.01); *H01M 10/48* (2013.01); *H01M 2010/4271* (2013.01); *H01M 2010/4278* (2013.01); *H02J 7/0031* (2013.01)

(58) Field of Classification Search
CPC ...................................................... H02H 7/18
See application file for complete search history.

(56) References Cited

U.S. PATENT DOCUMENTS

2003/0151868 A1    8/2003  Inae et al.
2013/0149604 A1    6/2013  Fujiki et al.
(Continued)

FOREIGN PATENT DOCUMENTS

JP    6-205541 H    7/1994
JP    2015111550 A  6/2015
(Continued)

OTHER PUBLICATIONS

Wikipedia contributors. "Current source." Wikipedia, The Free Encyclopedia. Wikipedia, The Free Encyclopedia, Oct. 12, 2019. Web. Nov. 1, 2019. (Year: 2019).*
(Continued)

*Primary Examiner* — Daniel J Cavallari
(74) *Attorney, Agent, or Firm* — The Noblitt Group, PLLC (57) ABSTRACT

A calibration circuit may comprise a negative pack terminal, an intermediate node, and a first protection IC coupled to a first transistor. The first transistor may be coupled between the negative pack terminal and the intermediate node. The calibration circuit may comprise a second protection IC coupled in parallel with the first protection IC and further coupled to a second transistor. A power source may be coupled in parallel with the first and second protection ICs, and a current source may be coupled between the negative pack terminal and the intermediate node, wherein the intermediate node is positioned between the first transistor and the second transistor, and the power source is configured to provide a current to the first protection IC through a first current loop.

18 Claims, 12 Drawing Sheets

(51) Int. Cl.
*H02H 3/00* (2006.01)
*H01M 10/48* (2006.01)
*H01M 10/44* (2006.01)
*H02J 7/00* (2006.01)

(56) References Cited

U.S. PATENT DOCUMENTS

| | | | |
|---|---|---|---|
| 2016/0043370 A1 | 2/2016 | Hatta et al. | |
| 2016/0380447 A1* | 12/2016 | Kadirvel | H02J 7/0026 320/112 |
| 2017/0033547 A1* | 2/2017 | Hayashi | H02H 7/18 |
| 2017/0033574 A1* | 2/2017 | Imaizumi | H02J 7/0072 |
| 2017/0098943 A1* | 4/2017 | Kubota | H02J 7/0029 |
| 2018/0183247 A1* | 6/2018 | Yamauchi | H02J 7/0029 |

FOREIGN PATENT DOCUMENTS

| | | | | |
|---|---|---|---|---|
| WO | WO-2016167467 A1 * | 10/2016 | | H02H 7/18 |
| WO | WO-2017030321 A1 * | 2/2017 | | H01M 10/44 |

OTHER PUBLICATIONS

Wikipedia contributors. "Series and parallel circuits." Wikipedia, The Free Encyclopedia. Wikipedia, The Free Encyclopedia, Oct. 29, 2019. Web. Nov. 1, 2019. (Year: 2019).*

* cited by examiner

METHODS AND APPARATUS FOR VOLTAGE AND CURRENT CALIBRATION

BACKGROUND OF THE TECHNOLOGY

The rise in capacity of batteries requires new protection circuits to protect the battery from over-voltage or over-current situations. As the transistors operating the protection circuit become more sensitive over time, so must the calibration equipment used to calibrate the protection circuits. Modern battery packs may comprise multiple protection ICs.

SUMMARY OF THE INVENTION

A calibration circuit according to various aspects of the present invention may operate in conjunction with a battery pack having a negative pack terminal and a first protection IC coupled to a first transistor, wherein the first transistor is coupled between the negative pack terminal and an intermediate node. The calibration circuit may operate in conjunction with a second protection IC coupled in parallel with the first protection IC and coupled to a second transistor. A power source may be coupled in parallel with the first and second protection ICs, and a current source may be coupled between the negative pack terminal and the intermediate node, wherein the intermediate node is positioned between the first transistor and the second transistor, and the power source is configured to provide a current to the first protection IC through a first current loop.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various voltage sensors, current sensors, powers sources, current sources, semiconductor devices such as transistors and capacitors, and the like, which may carry out a variety of functions. In addition, the present technology may be practiced in conjunction with any number of electrical systems and the systems described are merely exemplary applications for the technology. Further, the present technology may employ any number of conventional techniques for measuring current and voltage levels as well as data trimming processes.

Referring to FIGS. 1A-E, in one embodiment, a calibration circuit 100 for calibrating the voltage and/or current of a protection IC 102 may comprise a power source 101, a pulse generator 103, and a current source 104. A battery pack 105 may include the protection IC 102, which may comprise an internal storage unit (not shown) configured to receive and store data.

Figure 1A:
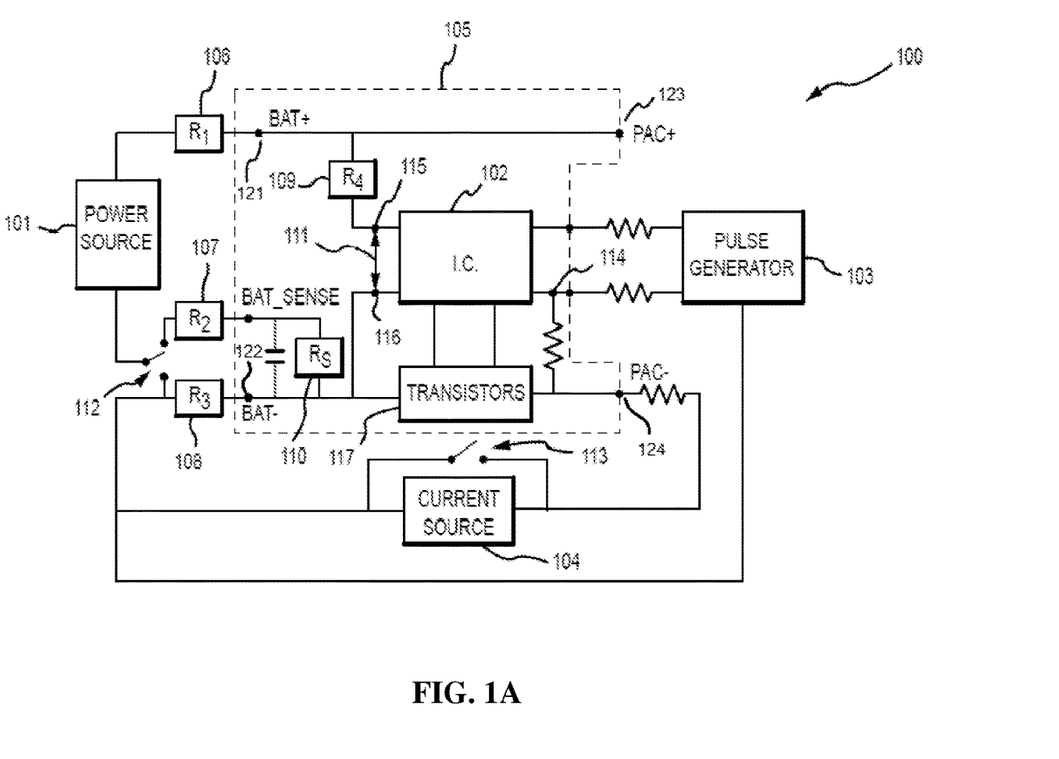
FIG. 1A is a block diagram of the calibration circuit.
Figure 1B:
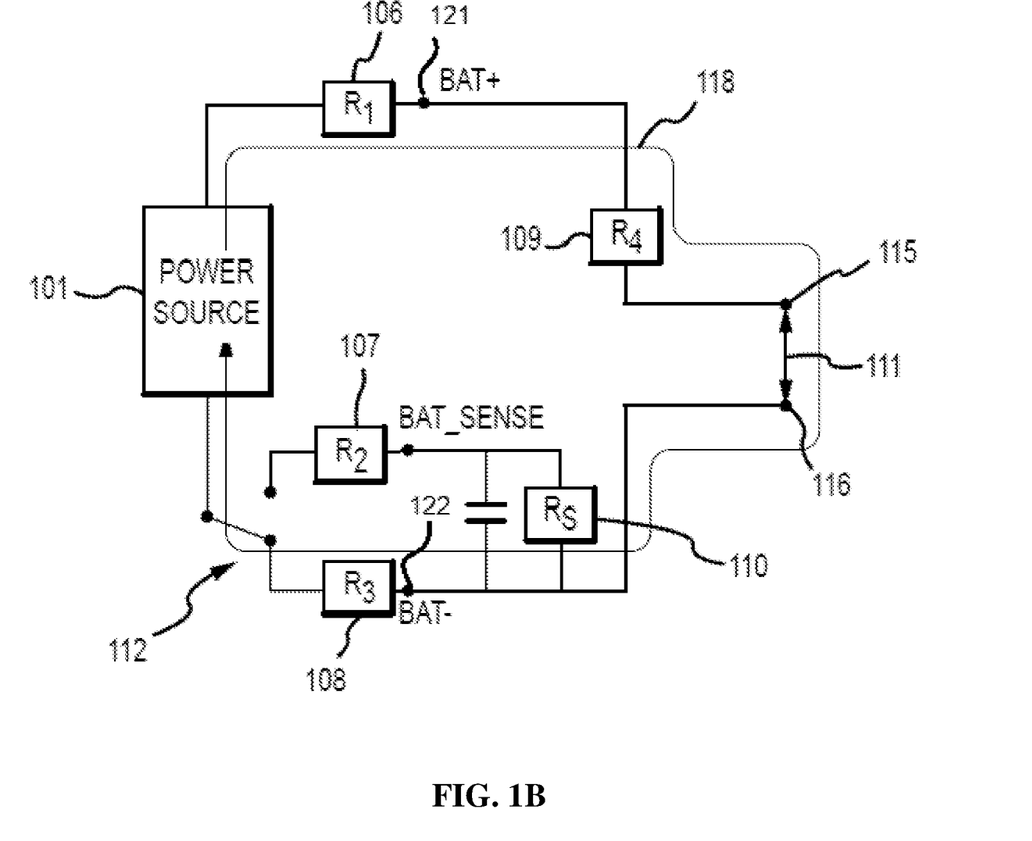
FIG. 1B is a block diagram of a first current loop.
Figure 1C:
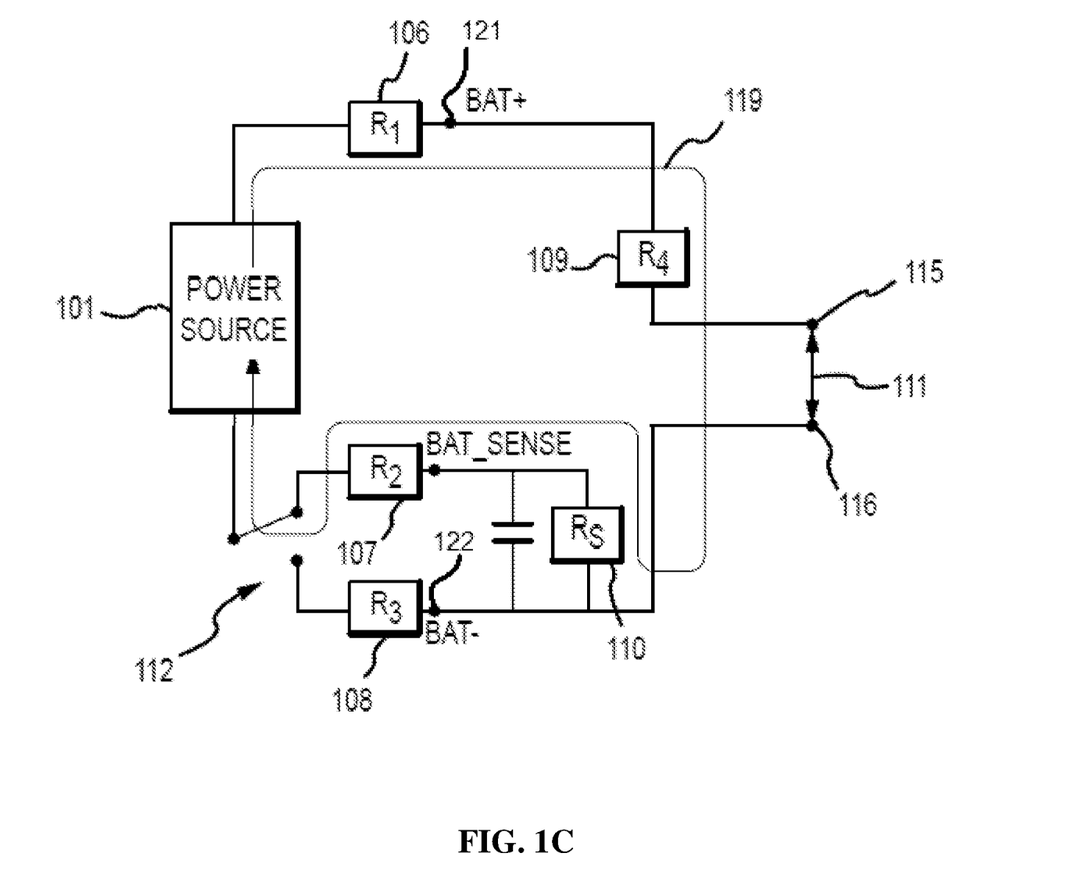
FIG. 1C is a block diagram of a second loop.

Now referring to FIGS. 1A-C, in one embodiment, the power source 101 may be selectively coupled to the protection IC 102 and provide a current to the protection IC 102 through one of a first current loop 118 and a second current loop 119. The specific paths of the first current loop 118 and second current loop 119 may be controlled by a first switching device 112. The power source 101 may provide a predetermined voltage ($V_{SET}$). For example, the power source 101 may provide an initial voltage $V_{SET}$ which may be utilized by the calibration circuit 100 when calibrating the voltage and/or current for the protection IC 102.

The calibration circuit 100 may utilize either the first current loop 118 or the second current loop 119, depending on various characteristics the calibration circuit 100 is attempting to calibrate. For example, the first current loop 118 may be utilized when the calibration circuit 100 is configured to calibrate the voltage of the protection IC 102, and the second current loop 119 may be utilized when the calibration circuit 100 is configured to calibrate the current of the protection IC 102.

In one embodiment, the calibration circuit 100 may operate in conjunction with resistors 106-110. One or more of the resistors, such as resistors 106, 107, and 108, may not be applicable until another electrical component is coupled to the calibration circuit 100 (contact resistance). For example, when an electrical component is electrically coupled to resistor $R_1$ 106, $R_2$ 107, and/or $R_3$ 108, the electrical connection adds impedance in the electrical flow. In contrast, when no other electrical components are coupled, no additional impedance is created in the electrical flow. Resistor $R_S$ 110 may comprise a sense resistor coupled between the power source 101 and the second terminal 116 of the protection IC 102.

In one embodiment, the calibration circuit 100 and/or the battery pack 105 may comprise transistors 117 electrically coupled to the IC 102. The transistors 117 may comprise any suitable transistor(s), for example a FET transistor. The transistors 117 may utilize a plurality of operating states such as an "on" state, "off" state, and/or the like.

In one embodiment, the battery pack 105 may comprise any suitable system or device configured to operate as a battery. The battery pack 105 may comprise a positive battery terminal (BAT+) 121 and a negative battery terminal (BAT−) 122. The battery pack 105 may further comprise a positive battery pack terminal (PAC+) 123 and a negative battery pack terminal (PAC−) 124.

In one embodiment, the protection circuit 102 may comprise two electrical terminals configured to provide an electrical contact such that the current and voltage of the calibration circuit can be monitored or collected. A first terminal 115 and a second terminal 116 may provide testing points for calibrating the voltage of the protection IC 102. A third terminal 114 may provide a testing point for calibrating the current of the protection IC 102.

In one embodiment, the calibration circuit 100 may comprise the pulse generator 103. The pulse generator 103 may comprise any suitable system or device configured to provide electrical pulses. The pulse generator 103 may be configured to apply a test signal to the protection IC 102.

Figure 1D:
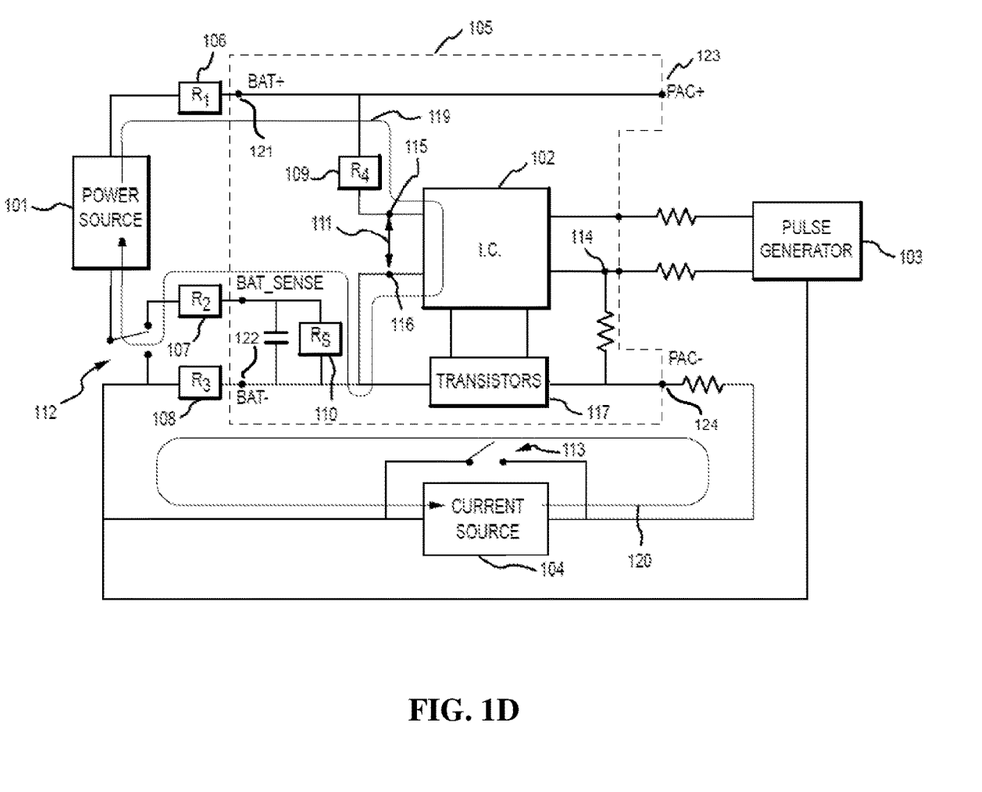
FIG. 1D is a block diagram depicting the calibration circuit configured to calibrate a current.
Figure 1E:
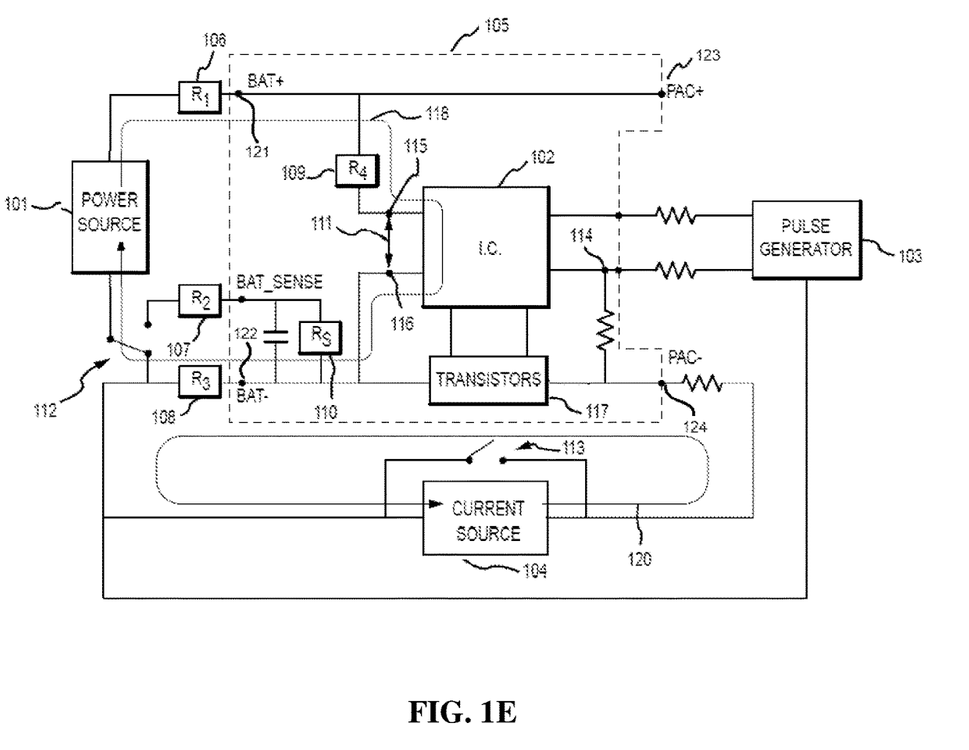
FIG. 1E is a block diagram depicting the calibration circuit configure to calibrate a voltage.

The current source 104 may comprise any suitable system or device configured to provide the calibration circuit 100 with a current. The current source 104 may be coupled between the negative pack terminal and the negative battery terminal to form a third current loop 120 through the battery pack 105 as shown in FIGS. 1D and 1E. The current source 104 may be configured to be disabled or disconnected from the battery pack 105, for example with a second switching device 113. The second switching device 113 may be configured to operate as a bypass, wherein the bypass restricts the flow of the third current loop 120 and prevents the third current loop 120 from entering the battery pack 105.

Still referring to FIGS. 1A-C, in one embodiment, the power source 101 may operate in conjunction with the first switching device 112 to provide current through either the first current loop 118 or the second current loop 119. The first switching device may select between using one of the first current loop 118 or the second current loop 119.

The first current loop 118 may originate from power source 101. The first current loop 118 may flow through at least one resistor ($R_4$) 109 and create a voltage drop between terminals 115 and 116 of the protection IC 102. The voltage between terminals 115 and 116 of the IC 102 may be designated as $V_{CC}$ 111. In an ideal configuration, the value of $V_{CC}$ 111 should be as close to the value of the $V_{SET}$ produced by the power source 101. For example, if the power source 101 is configured to produce a 3.7V $V_{SET}$, then the value of $V_{CC}$ should be as close to 3.7V as possible. As discussed below, the calibration circuit 100 may utilize the first switching device 112 to direct the first current loop 118 such that the value of Vcc is close to the value produced by the power source 101.

In one embodiment, the first switching device 112 may be configured to be in one of two positions. The calibration circuit 100 may be configured with any suitable system or device configured to switch the positions of the first switching device 112 from a first position to a second position. The first position may comprise a "HIGH" position, and the second position may comprise a "LOW" position. When the first switching device 112 is configured in a "HIGH" position, the path of the current flowing from the power source 101 may follow that of the second current loop 119 as shown in FIG. 1C. In this configuration, the second current loop 119 may originate from the power source 101 and flow through the sense resistor $R_S$ 110 coupled between the power supply and the second terminal 116 of the protection IC 102.

When the first switching device 112 is configured in a "LOW" position, the path of the current flowing from the power source 101 may follow that of the first current loop 118 as shown in FIG. 1B. In this configuration, the first current loop 118 may bypass the sense resistor $R_S$ 110 and provide a direct coupling of the power source 101 to the second terminal 116 of the protection IC 102.

Now referring to FIGS. 1E and 2A to 2E, in one embodiment, the calibration circuit 100 may perform voltage or current calibration of the protection IC 102. The calibration circuit 100 may calibrate the protection IC 102 for voltage and/or current. The calibration circuit 100 may be configured to selectively couple the power source 101 to the protection IC 102 through either the first current loop 118 or the second current loop 119 depending on the characteristic (voltage or current) being calibrated.

Figure 2A:
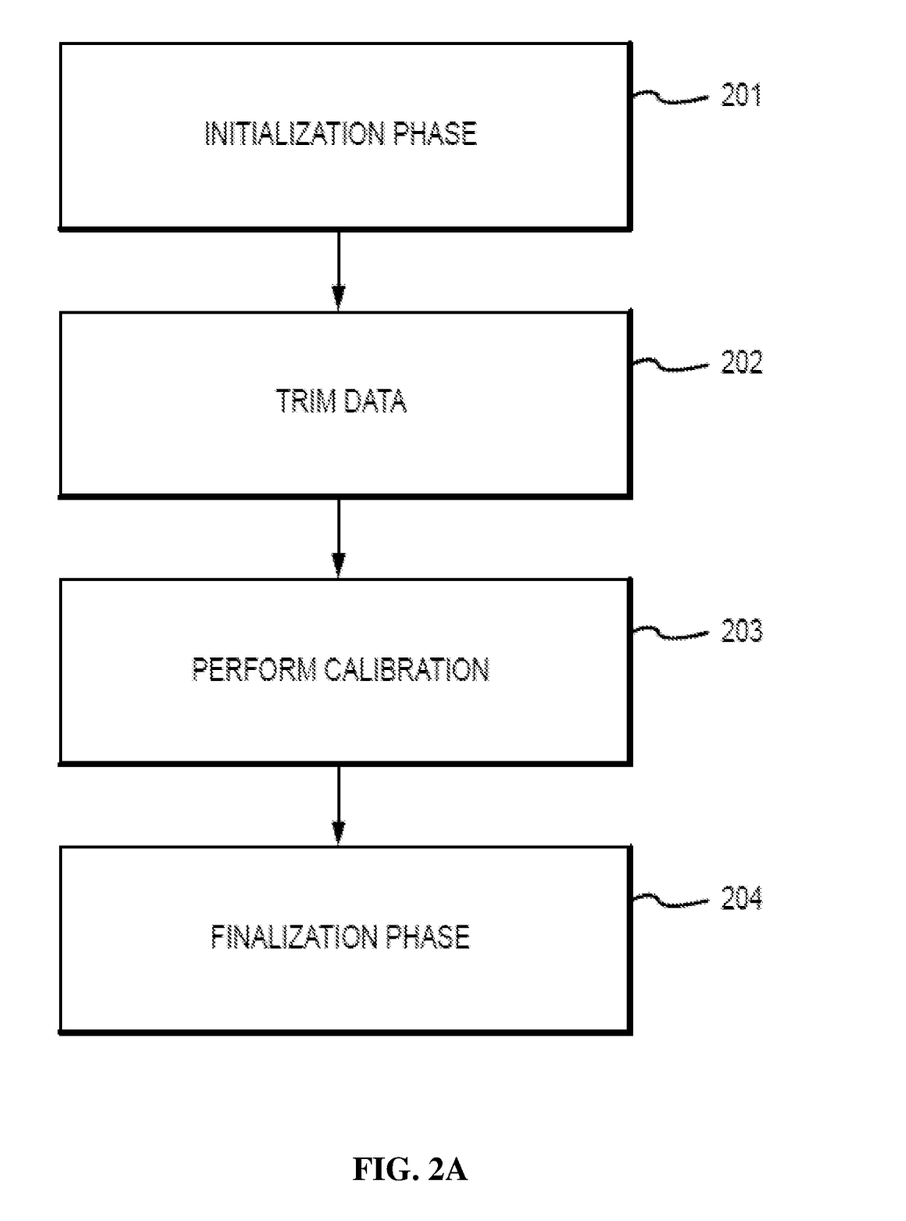
FIG. 2A is a high level flow chart of the process utilized by the calibration circuit to calibrate the voltage or the current.

The calibration circuit 100 may be configured to begin an initialization phase (201). The calibration circuit 100 may also trim the $V_{CC}$ voltage data 111 (202). The calibration circuit 100 may be configured to perform calibration of the IC 102 (203). The calibration circuit 100 may also perform a finalization phase (204).

In one embodiment, the initialization phase (201) may comprise providing the current source 104 and power source 101 with an initial set of settings (205). The initial settings may comprise any suitable settings for utilizing the calibration circuit 100. For example, the initial settings may comprise setting the value of $V_{SET}$ for the power source 101 as well as configuring the current level produced by the current source 104.

Figure 2B:
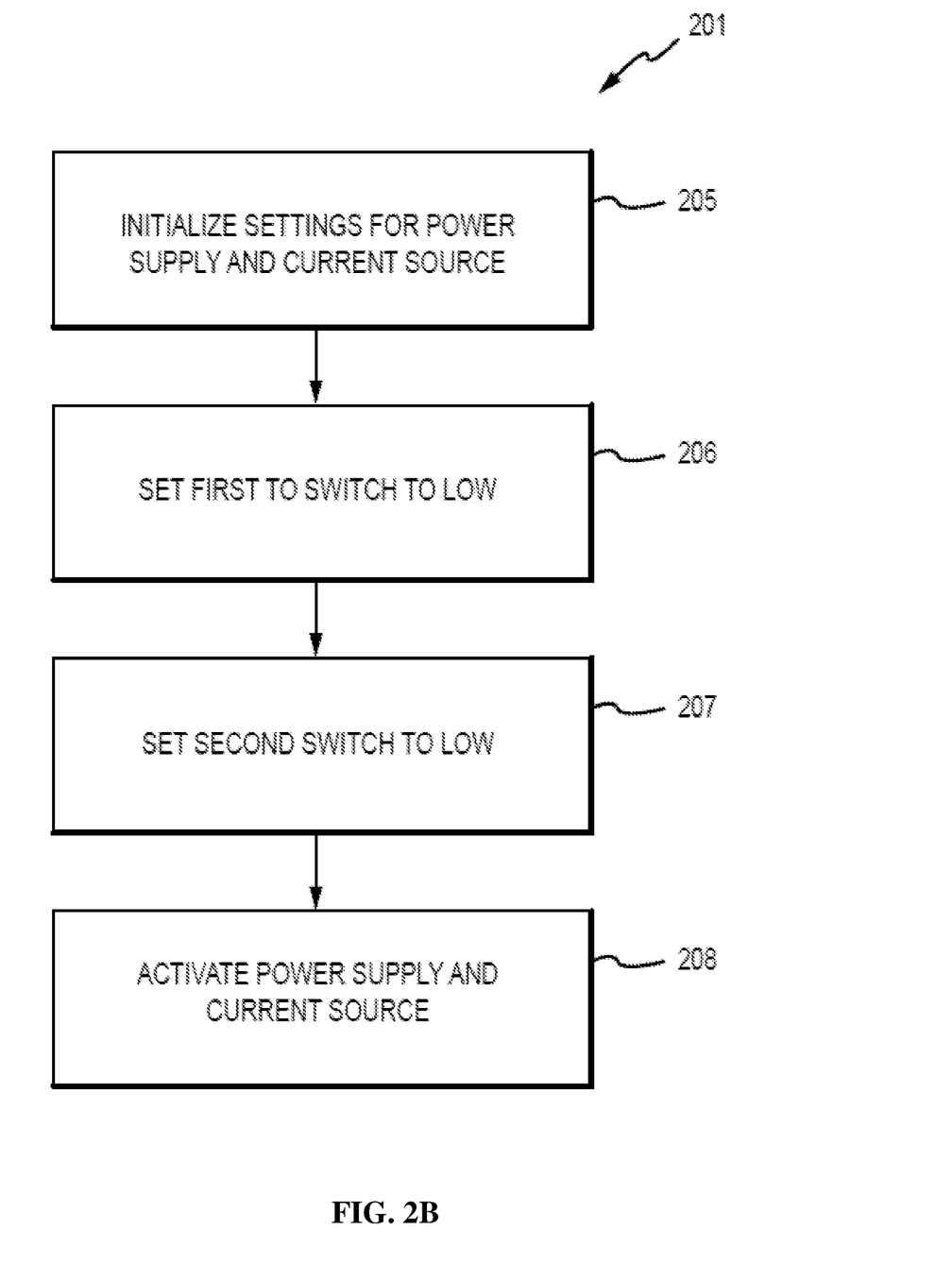
FIG. 2B is a detailed flow chart of the initialization phase utilized by the calibration circuit for calibrating the voltage.

Referring now to FIG. 2B, in one embodiment, after the power source 101 and current source 104 have been provided with their respective initial settings (205), the calibration circuit 100 may be configured to set the first switching device 112 to a "LOW" position (206). As previously discussed above, when the first switching device 112 is set in the "LOW" position, a current resembling the first current loop 118 can be observed flowing through the calibration circuit 100 as shown in FIG. 1B. Furthermore, as discussed above, in this configuration, the first current loop 118 bypasses resistor $R_S$ 110.

In one embodiment, after the first switching device 112 has been set to a "LOW" position, the calibration circuit 100 may be configured to set the second switching device 113 to a "LOW" position as well (207). When the second switching device 113 is set in a "LOW" position, the current produced by the current source 104 is bypassed/prevented from flowing into battery pack 105.

In one embodiment, after both the first switching device 112 and second switching device 113 have been set into their respective "LOW" positions, the power source 101 and/or current source 104 may be configured to be activated (208). The power source 101 and the current source 104 may be activated using the initial settings provided in step (205) as discussed above. The power source 101 and current source 104 may be activated in any order. For example, in one instance, the power source 101 may be activated prior to activating the current source 104. In another example, the current source 104 may be activated prior to activating the power source 101.

Figure 2C:
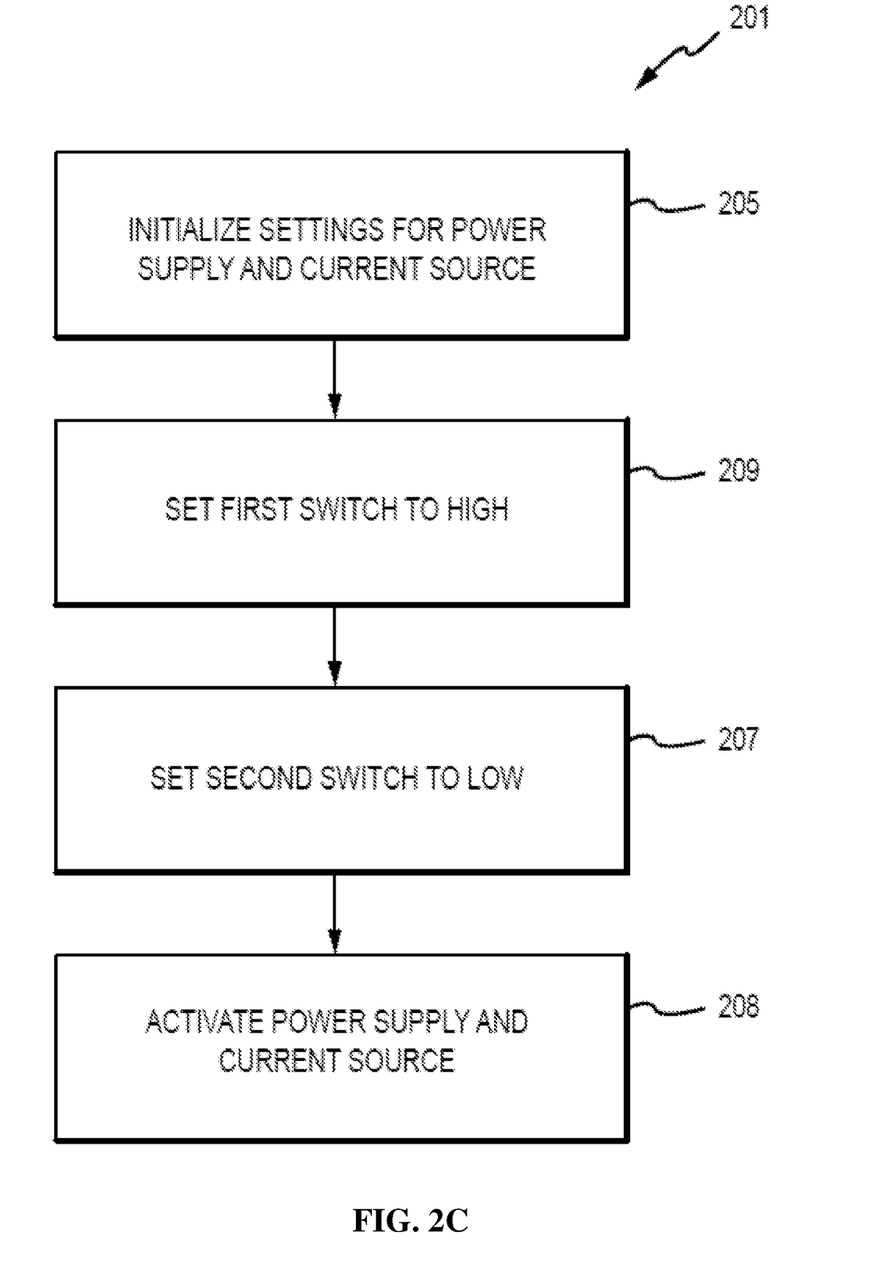
FIG. 2C is a detailed flow chart of the initialization phase utilized by the calibration circuit for calibrating the current.
Figure 2D:
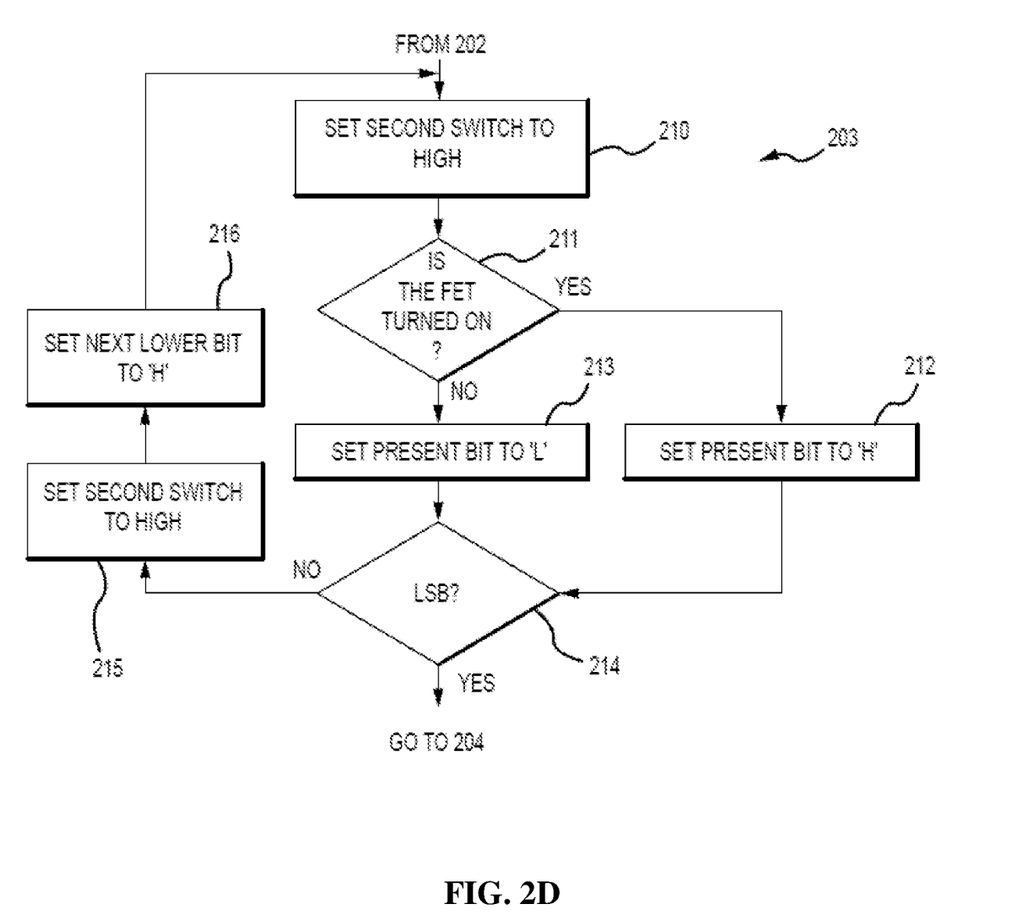
FIG. 2D is a detailed flow chart illustrating the calibration process.

Now referring to FIGS. 2A-B and 2D, the calibration circuit 100 may trim the $V_{CC}$ voltage data 111 (203). In one embodiment, the data to be trimmed may comprise an 8-bit value corresponding to a detected $V_{CC}$ voltage across terminals 115 and 116 of the protection IC 102. The trimmed data may be stored within the storage unit (not shown) communicatively coupled to the protection IC 102 and/or the calibration circuit 100.

In one embodiment, prior to the trimming process, all bits within the 8-bit voltage value may be set to "LOW" (00000000). Next, the second switching device 113 may be selectively set in the "HIGH" position to couple the current source 104 to the protection IC 102 through the third current loop 120.

After the third current loop 119 has been selectively coupled to the current source 104, the calibration circuit 100 may be configured to determine the operating state of the transistors 117. If the transistors 117 are determined to be on or active, then the current bit of the 8-bit value corresponding to the voltage may be set to "HIGH" (corresponding to a value of 1) (212). If the transistors 117 are determined to be off or inactive, then the present bit of the 8-bit value corresponding to the voltage may be set to "LOW" (corresponding to a value of 0) (213).

Next, the calibration circuit 100 determines whether additional iterations are needed or if the trimming process has been completed by determining the binary position of the next data bit in the 8-bit voltage data. In this particular example, because the detected voltage value is represented using an 8-bit value, the process may be repeated up to eight times (once for each bit of the eight possible bits). The calibration circuit 100 may be configured to check with the least significant bit of the 8-bit detected voltage value is being trimmed (214). If the calibration circuit 100 determines that the current bit being trimmed is the least significant bit (214), then the calibration circuit 100 may be configured to initiate the finalization phase (204).

If the calibration circuit 100 determines that the bit to be trimmed is not the least significant bit, then the calibration circuit 100 may be configured to change the position of the second switch from "LOW" to "HIGH" (215). Changing the position of the second switch to "HIGH" may result in the third current loop 120 being permitted to flow through the calibration circuit 100 again.

After setting the second switch to a "HIGH" position (215), the calibration circuit 100 may be configured to set the next lower bit in the 8-bit value corresponding to the voltage value to "H" (corresponding to the value of 1) (216). The calibration circuit 100 may then be configured to repeat the above process. The process may be repeated by the calibration circuit 100 until all eight bits of the 8-bit value has been trimmed.

In one embodiment, the calibration circuit 100 may be configured to store the 8-bit value in the internal storage unit (not shown) of the IC 102. Other components may access the calibration circuit 100 and obtain the value from the IC 102.

Now referring to FIGS. 1D and 2C, in one embodiment, the calibration circuit 100 may be configured to calibrate the current of the protection circuit 102. Calibrating the current may comprise substantially the same process described above, with a few differences. First, to calibrate the current, the calibration circuit 100 may be configured to switch the first switching device 112 to a "HIGH" position (209). As discussed above, when the first switching device 112 is configured in the "HIGH" position, the current may be represented by the second current loop 119.

Figure 3A:
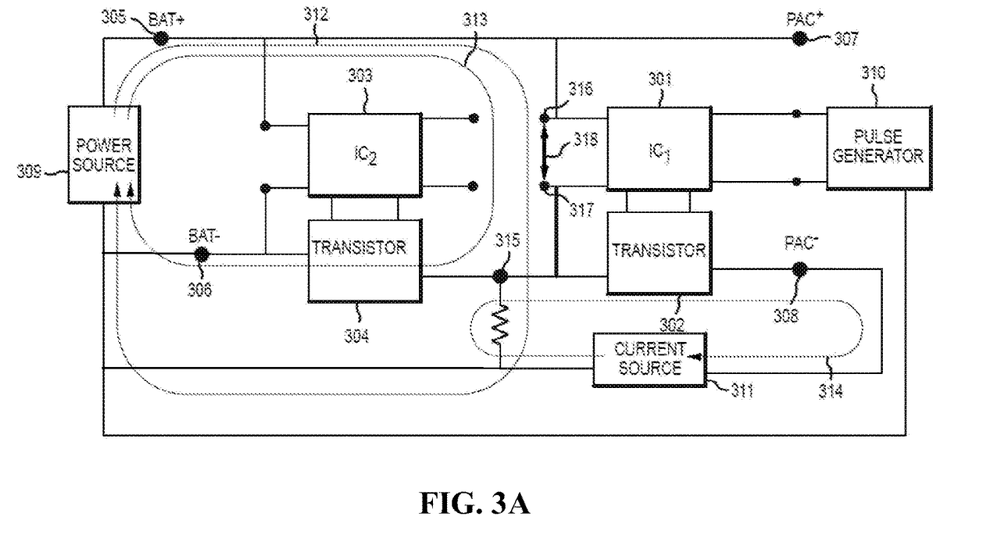
FIG. 3A is a block diagram depicting a second embodiment of the calibration circuit.
Figure 3B:
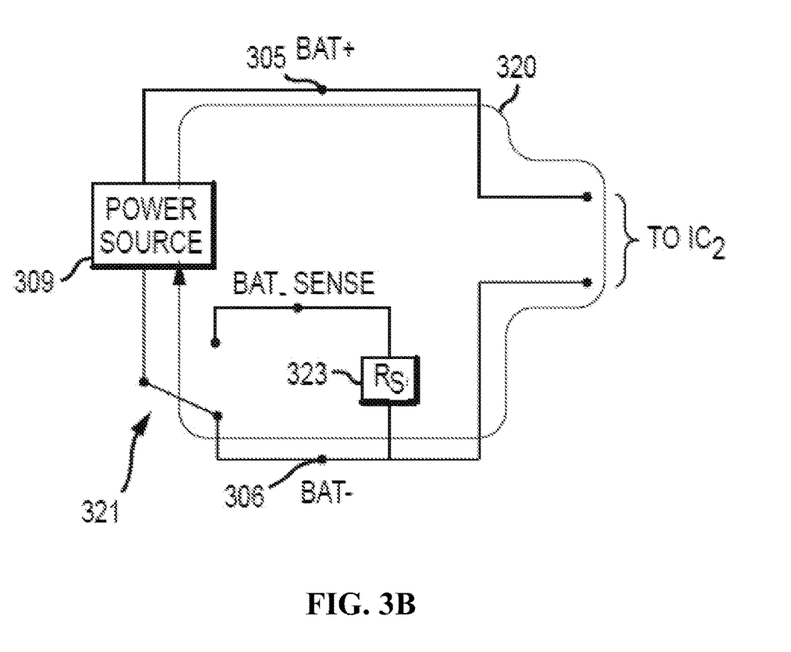
FIG. 3B is a block diagram of a current calibration loop.
Figure 3C:
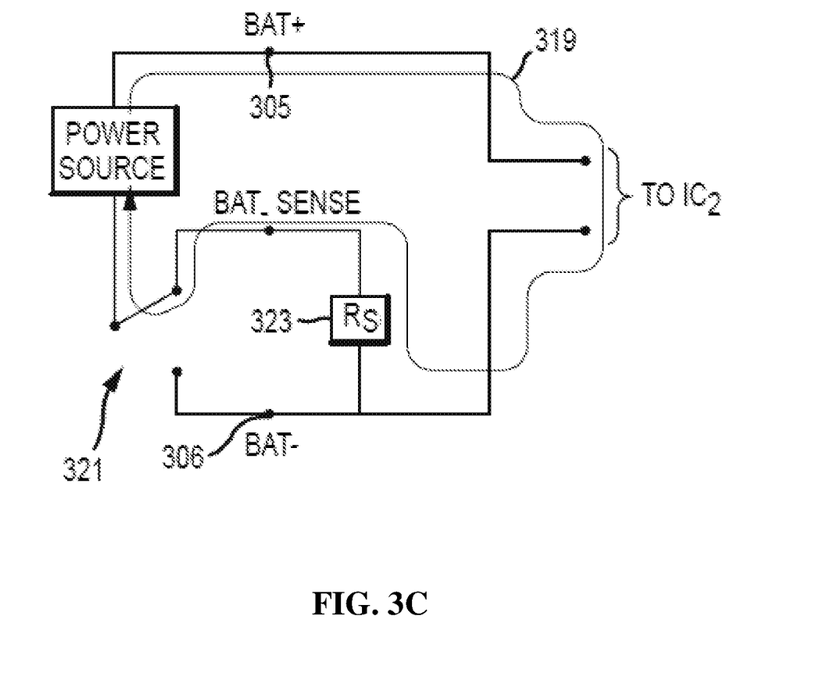
FIG. 3C is a block diagram of a voltage calibration loop.

Now referring to FIGS. 3A-C, in one embodiment, a calibration circuit 300 may operate in conjunction with a plurality of protection ICs 301, 303. The calibration circuit 300 may operate with a negative pack terminal 308 coupled to negative terminal of a battery pack (not shown) and a positive pack terminal 307 coupled to the positive terminal of the battery pack. The calibration system 300 may operate with a positive battery terminal 305 and a negative battery terminal 306. The positive battery terminal 305 and negative battery terminal 306 may be configured to be coupled to a power source 309. The power source 309 may comprise substantially the same power source as described above in the alternative embodiment. Likewise, the calibration system 300 may further comprise a pulse generator 310 and current source 311 comprising substantially the same pulse generator and current source as described above in the alternative embodiment.

In one embodiment, the calibration circuit 300 may comprise a first protection IC 301 coupled to a first transistor 302. The first transistor 302 may comprise substantially the same transistor as described above in the alternative embodiment. The first transistor 302 may be coupled between the negative pack terminal 308 and an intermediate node 315. The intermediate node 315 may comprise an electrical point of contact between the first protection IC 301 (and first transistor 302) and the second protection IC 303 (and second transistor 304). The intermediate node 315 may not be static, and can be located at various locations depending on the specific protection IC being calibrated amongst the plurality of protection ICs.

In one embodiment, the calibration circuit 300 may operate with a second protection IC 303 coupled in parallel with the first protection IC 301. The second protection IC 303 may comprise substantially the same type of protection IC as the first protection IC 301. The second protection IC 303 may be coupled to a second transistor 304. The second transistor 304 may comprise substantially the same transistor as described above in the alternative embodiment. The second transistor 304 may be coupled between the negative battery terminal 306 and the intermediate node 315.

In one embodiment, the calibration circuit 300 may comprise a power source 309 coupled in parallel with the first protection IC 301 and the second protection IC 303. The calibration circuit 300 may further comprise a current source 311 coupled between the negative pack terminal 308 and the intermediate node 315. The power source 309 may be configured to provide a current to the first protection IC 301 and/or the second protection IC 303.

Now referring to FIG. 3A, in one embodiment, the current provided by the power source 309 may comprise a first current loop 313. The first current loop 313 may be configured to flow through the second transistor 304. The current provided by the power source 309 may comprise a second current loop 312. The second current loop 312 may be configured to bypass the second transistor 304. The second transistor 304 may be configured to select between the first current loop 313 and the second current loop 312. For example, if the second transistor 304 is configured in an "ON" or activated state, then the current may resemble that of the first current loop 313. In contrast, if the second transistor 304 is configured in an "OFF" or deactivated state, then the current may resemble that of the second current loop 312. The first current loop 313 and the second current loop 312 may be configured to generate a first voltage 318 across a first terminal 316 and a second terminal 317 of the first protection IC 301. The first terminal 316 and the second terminal 317 may comprise the respective first and second terminals of all of the protection ICs 301, 303 within the calibration circuit 300.

The current source 311 may be configured to generate a current source loop 314. The current source loop 314 may be configured to flow through the first transistor 302. The current source 311 may comprise a selectable bypass loop (not shown) to restrict the flow of the current source loop 314. For example, the calibration system 300 may be configured to restrict the flow of the current source loop 314 into the battery pack by activating the current source 311 bypass.

Now referring to FIGS. 3A-C and 4, in one embodiment, the calibration circuit 300 may be configured to perform calibration of the first protection IC 301. To calibrate the first protection IC 301, the calibration circuit 300 may first be configured to perform calibration on the second protection IC 303 (401). Calibrating the second protection circuit 303 may comprise substantially the same process as described above in the alternative embodiment for calibrating a single protection IC.

In one embodiment, calibrating the second protection IC 303 may comprise selectively coupling the power source 309 to the second protection IC 303 through one of a current calibration loop 319 and a voltage calibration loop 320. As discussed in the alternative embodiment above, determining which of the current calibration loop 319 or voltage calibration loop 320 to use may depend on which characteristic (voltage or current) the calibration circuit 300 is configured to calibrate. The calibration circuit 300 may be configured to utilize the voltage calibration loop 320 when the calibration circuit 300 is configured to calibrate voltage, and the calibration circuit 300 may be configured to utilize the current calibration loop 319 when the calibration circuit 300 is configured to calibrate for current.

Selecting between the current calibration loop 319 and the voltage calibration loop 320 may comprise activating a first switching device 321 as discussed above in the alternative embodiment. For example, when the first switching device 321 is configured in a "HIGH" position, the calibration circuit 300 may be configured to perform current calibration of the second IC 303 as shown in FIG. 3C, and when the first switching device 321 is configured in a "LOW" position, the calibration circuit 300 may be configured to perform voltage calibration as shown in FIG. 3B.

As discussed above, depending on the characteristic being calibrated, the current calibration loop 319 may comprise a sense resistor $R_S$ 323. The sense resistor $R_S$ 323 may comprise the same sense resistor as discussed in the alternative embodiment above, and may be configured in substantially the same configuration as discussed above.

Figure 4:
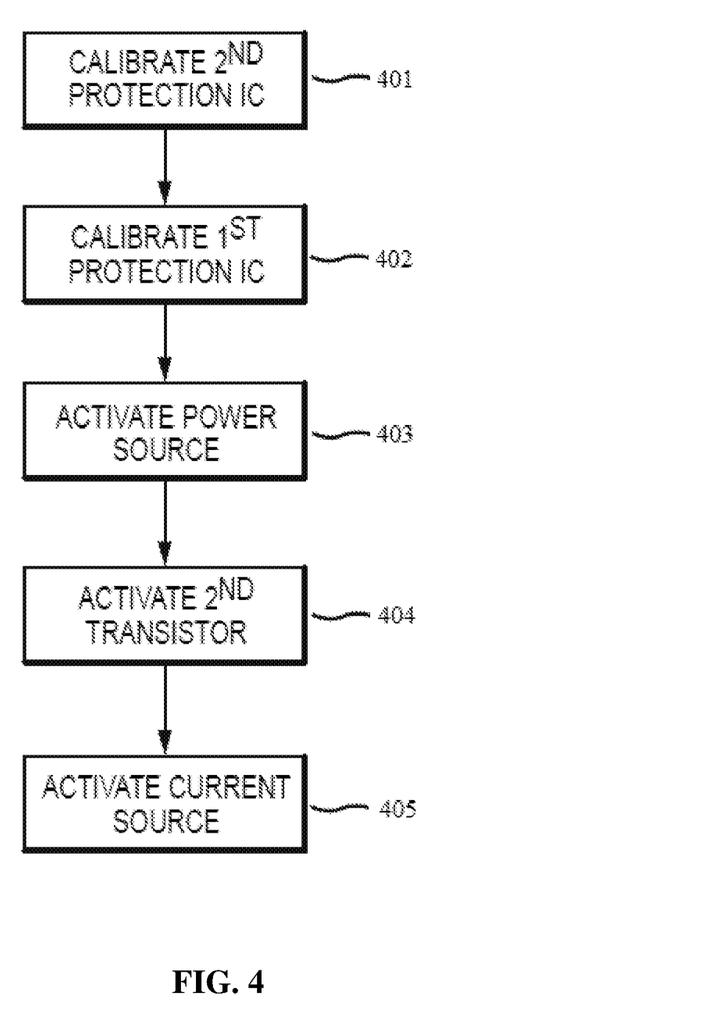
FIG. 4 is a flow chart illustrating a calibration process utilizing the second embodiment of the calibration circuit.

After the calibration circuit 300 has calibrated the second protection IC 303, the calibration circuit 300 may be configured to perform calibration of the first protection IC 301 (402). The calibration circuit 300 may be configured to activate the power source 309 (403). The calibration circuit 300 may be configured to activate the second transistor 304 such that the first current loop 313 is configured to flow through the calibration circuit 300 (404). The current source 311 may be activated and configured to form a current source loop 314 (405).

Now referring to FIG. 4, in one embodiment, the calibration circuit 300 may be configured to calibrate a battery pack (not shown) comprising more than two protection ICs. The process utilized by the calibration circuit 300 to calibrate additional protection ICs may comprise the same process as discussed above. Each of the protection ICs may comprise its own respective transistor. For example, if the calibration circuit 300 is configured to calibrate the first protection IC in a system with three protection ICs (and three accompanying transistors), the calibration circuit 300 may be first configured to calibrate the third protection IC first, then the second protection IC, and finally the first protection IC. Each of the individual ICs may be calibrated according to the process discussed above. Calibrating the first protection IC may further comprise activating the transistors of both the second protection IC and the third protection IC such that the current may flow through the second and third transistors.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A calibration circuit, comprising:
 a battery pack comprising a negative pack terminal; and
 an intermediate node;
 a first protection IC coupled to a first transistor, wherein the first transistor is coupled between the negative pack terminal and the intermediate node;

a second protection IC coupled in parallel with the first protection IC and coupled to a second transistor;

a power source adapted to be coupled in parallel with the first and second protection ICs; and a current source adapted to be coupled between the negative pack terminal and the intermediate node;

wherein:

the intermediate node is positioned between the first transistor and the second transistor; and the power source is configured to provide a current to the first protection IC through a first current loop.

2. The calibration circuit according to claim 1, wherein the first current loop comprises the second transistor.

3. The calibration circuit according to claim 1, wherein the second transistor is configured to select between the first current loop and a second current loop configured to bypass the second transistor.

4. The calibration circuit according to claim 1, wherein the first current loop is configured to generate a first voltage across a first terminal and a second terminal of the first protection IC.

5. The calibration circuit according to claim 1, wherein the current source is configured to generate a current source loop, wherein the current source loop flows through the first transistor.

6. The calibration circuit according to claim 5, wherein the current source comprises a selectable bypass loop to restrict the flow of the third current loop.

7. The calibration circuit according to claim 1, further comprising a pulse generator configured to provide a test signal to the protection IC being calibrated.

8. A method for performing calibration of a first protection IC coupled in parallel with a second protection IC and a power source, wherein the first protection IC is coupled to a first transistor and the second protection IC is coupled to a second transistor, comprising:

calibrating the second protection IC; and calibrating the first protection IC after the second protection IC has been calibrated, comprising:

activating the power source to generate a first current;

activating the second transistor to form the first current into a first current loop through the second transistor; and generating a second current with a current source to form a second current loop, wherein the second current flows through the first transistor.

9. The method for performing calibration according to claim 8, wherein calibrating the second protection IC comprises selectively coupling the power source to the second protection IC through one of a current calibration loop and a voltage calibration loop.

10. The method for performing calibration according to claim 9, wherein the current calibration loop comprises a sense resistor coupled between the power source and a second terminal of the second protection IC.

11. The method for performing calibration according to claim 8, wherein calibrating the second protection IC comprises selectively coupling the current source to a bypass loop, wherein the bypass loop bypasses the second protection IC.

12. The method for performing calibration according to claim 11, wherein calibrating the first protection IC comprises applying a test signal from a pulse generator coupled to the first protection IC when the current source is coupled to the bypass loop.

13. A calibration system, comprising:

a battery pack comprising:

a positive pack terminal;

a negative pack terminal;

an intermediate node;

a first protection IC coupled to the positive pack terminal and a first transistor, wherein the first transistor is coupled between the negative pack terminal and the intermediate node;

a second protection IC coupled in parallel with the first protection IC and coupled to a second transistor, wherein the second transistor is coupled between the intermediate node and the negative pack terminal;

a power supply coupled between the positive and negative pack terminal; and a current source coupled between the negative pack terminal and the intermediate node;

wherein:

the power source is capable of delivering a current to the first protection IC through a first current loop; and the first current loop comprises the second transistor.

14. The calibration circuit according to claim 13, wherein the second transistor is configured to select between the first current loop and a second current loop configured to bypass the second transistor.

15. The calibration circuit according to claim 13, wherein the first current loop is configured to generate a first voltage across a first terminal and a second terminal of the first protection IC.

16. The calibration circuit according to claim 1, wherein the current source is configured to generate a current source loop, wherein the current source loop flows through the first transistor.

17. The calibration circuit according to claim 5, wherein the current source comprises a selectable bypass loop to restrict the flow of the third current loop.

18. The calibration circuit according to claim 1, further comprising a pulse generator configured to provide a test signal to the protection IC being calibrated.

* * * * *